(12) United States Patent
Roth et al.

(10) Patent No.: US 10,215,084 B2
(45) Date of Patent: Feb. 26, 2019

(54) DIRECTLY COMMUNICATED TURBOCHARGER

(71) Applicant: BorgWarner Inc., Auburn Hills, MI (US)

(72) Inventors: David B. Roth, Groton, NY (US); Jorn Timm Kiener, Ludwigsburg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/751,811

(22) Filed: Jun. 26, 2015

(65) Prior Publication Data

US 2015/0292393 A1    Oct. 15, 2015

Related U.S. Application Data

(62) Division of application No. 13/522,534, filed on Jul. 17, 2012, now Pat. No. 9,086,011.

(51) Int. Cl.
*F02B 37/00* (2006.01)
*F02B 37/02* (2006.01)
(Continued)

(52) U.S. Cl.
CPC .............. *F02B 37/02* (2013.01); *F01D 25/14* (2013.01); *F01D 25/28* (2013.01); *F02B 37/001* (2013.01); *F02B 37/007* (2013.01); *F02B 37/025* (2013.01); *F02B 39/005* (2013.01); *F02B 39/14* (2013.01); *F02B 67/10* (2013.01); *F02C 6/12* (2013.01); *F02C 7/06* (2013.01); *F02C 7/12* (2013.01); *F02F 1/243* (2013.01);
(Continued)

(58) Field of Classification Search
CPC . F02F 1/00; F02F 1/243; F02B 37/001; F02B 37/02; F02B 37/007; F02B 39/005; F02B 39/14; F02M 26/07; F05D 2220/40; F05D 2260/98; F05D 2260/20; Y02T 10/144; Y02T 10/121; F02C 7/06; F02C 7/12; F02C 6/12; F01N 3/10
USPC ......................................................... 60/605.3
See application file for complete search history.

(56) References Cited

U.S. PATENT DOCUMENTS

| 3,673,798 A | 7/1972 | Kuehl |
| 4,206,606 A | 6/1980 | Yamada |

(Continued)

FOREIGN PATENT DOCUMENTS

| CN | 101493029 A | 7/2009 |
| CN | 101624943 A | 1/2010 |

(Continued)

OTHER PUBLICATIONS

Korean Office Action dated Jul. 1, 2016, Application No. 10-2012-7021000; Applicant: BorgWarner Inc.; 12 pages.
(Continued)

*Primary Examiner* — Jason Shanske
*Assistant Examiner* — Jessica Kebea
(74) *Attorney, Agent, or Firm* — BrooksGroup

(57) ABSTRACT

One illustrative embodiment includes a turbocharger (16, 18) with a turbine (94) and a compressor (96). The turbine (94) has an inlet passage (114) which may directly communicate with a blowdown exhaust passage (34, 36, 38) of a cylinder head (12) of an internal combustion engine (14). The inlet passage (114) may directly receive exhaust gas from the blowdown exhaust passage (34, 36, 38).

5 Claims, 6 Drawing Sheets

(51) Int. Cl.
  *F02B 37/007* (2006.01)
  *F02M 26/05* (2016.01)
  *F02M 26/07* (2016.01)
  *F02M 26/08* (2016.01)
  *F02M 26/23* (2016.01)
  *F01D 25/14* (2006.01)
  *F01D 25/28* (2006.01)
  *F02B 39/00* (2006.01)
  *F02B 39/14* (2006.01)
  *F02B 67/10* (2006.01)
  *F01N 3/10* (2006.01)
  *F02C 7/06* (2006.01)
  *F02C 7/12* (2006.01)
  *F02F 1/24* (2006.01)
  *F02C 6/12* (2006.01)

(52) U.S. Cl.
  CPC ............ *F02M 26/05* (2016.02); *F02M 26/07* (2016.02); *F02M 26/08* (2016.02); *F02M 26/23* (2016.02); *F01N 3/10* (2013.01); *F05D 2220/40* (2013.01); *F05D 2230/50* (2013.01); *F05D 2260/20* (2013.01); *F05D 2260/98* (2013.01); *Y02T 10/121* (2013.01); *Y02T 10/144* (2013.01)

(56) References Cited

U.S. PATENT DOCUMENTS

| | | | |
|---|---|---|---|
| 4,211,081 A | | 7/1980 | Yamada |
| 4,258,687 A | | 3/1981 | Mauch et al. |
| 4,513,571 A | | 4/1985 | Jenny et al. |
| 4,771,742 A | | 9/1988 | Nelson et al. |
| 4,959,961 A | | 10/1990 | Hiereth |
| 4,993,227 A | * | 2/1991 | Nagura ............... F02B 37/02 123/41.82 R |
| 5,067,452 A | * | 11/1991 | Elsbett ............... F02F 1/4235 123/193.5 |
| 5,095,704 A | * | 3/1992 | Nagura ............... F02B 37/02 60/612 |
| 5,417,068 A | * | 5/1995 | Olofsson ............ F01N 3/20 60/602 |
| 5,417,186 A | | 5/1995 | Elrod et al. |
| 5,447,130 A | * | 9/1995 | Kawamura ......... F01N 13/107 123/269 |
| 6,230,696 B1 | | 5/2001 | Veit et al. |
| 6,725,818 B2 | | 4/2004 | Methley |
| 6,883,319 B2 | | 4/2005 | Ekenberg |
| 7,284,521 B2 | | 10/2007 | Lechner et al. |
| 7,571,717 B2 | | 8/2009 | Nelson |
| 8,069,683 B2 | | 12/2011 | Ulrey et al. |
| 8,439,021 B2 | | 5/2013 | Vuk |
| 8,495,992 B2 | | 7/2013 | Roth |
| 8,572,963 B2 | | 11/2013 | Cuniberti et al. |
| 8,601,811 B2 | | 12/2013 | Pursifull et al. |
| 8,714,128 B2 | | 5/2014 | Galeazzi et al. |
| 8,763,395 B2 | * | 7/2014 | Nou ................. F02B 37/001 123/562 |
| 8,935,917 B2 | * | 1/2015 | Hayman ............ F01N 13/06 123/568.11 |
| 9,133,857 B2 | * | 9/2015 | Boening ............ F01D 25/14 |
| 2002/0069845 A1 | | 6/2002 | Heyes |
| 2007/0119168 A1 | | 5/2007 | Turner |
| 2009/0126659 A1 | | 5/2009 | Lester et al. |
| 2009/0151327 A1 | | 6/2009 | Zimmermann |
| 2009/0151343 A1 | | 6/2009 | Son et al. |
| 2009/0223220 A1 | | 9/2009 | Vuk |
| 2009/0241526 A1 | | 10/2009 | Son et al. |
| 2010/0095671 A1 | | 4/2010 | Takagawa et al. |
| 2010/0192882 A1 | | 8/2010 | Kaneko |
| 2010/0293924 A1 | | 11/2010 | Harima et al. |
| 2011/0016859 A1 | | 1/2011 | Schumnig |
| 2011/0154819 A1 | | 6/2011 | Robel |
| 2011/0173972 A1 | | 7/2011 | Wade et al. |
| 2011/0174247 A1 | | 7/2011 | Matthews et al. |
| 2012/0055424 A1 | | 3/2012 | Kuhlbach |
| 2012/0090320 A1 | | 4/2012 | Kuhlbach et al. |
| 2012/0180476 A1 | | 7/2012 | Steiner et al. |
| 2012/0192557 A1 | | 8/2012 | Johnson et al. |
| 2012/0240574 A1 | | 9/2012 | Friedfeldt et al. |
| 2012/0257966 A1 | * | 10/2012 | Boening ............ F01D 25/162 415/229 |
| 2012/0269620 A1 | * | 10/2012 | Boening ............ F01D 25/24 415/203 |
| 2012/0321455 A1 | * | 12/2012 | Boening ............ F01D 25/14 415/208.1 |
| 2013/0055971 A1 | | 3/2013 | Brewer et al. |
| 2013/0287564 A1 | * | 10/2013 | Fath ................ F02B 67/10 415/213.1 |
| 2013/0291540 A1 | | 11/2013 | Serres et al. |
| 2014/0165556 A1 | * | 6/2014 | Plagens ............ F02B 37/183 60/602 |

FOREIGN PATENT DOCUMENTS

| | | | |
|---|---|---|---|
| DE | 4344277 A1 | 6/1995 | |
| DE | 102007046657 A1 | 4/2009 | |
| DE | 102012001199 A1 | * 7/2013 | ............ F01N 3/046 |
| EP | 63055326 | 3/1988 | |
| EP | 1711699 B1 | 3/2007 | |
| EP | 1811154 A1 | 7/2007 | |
| EP | 2503125 A1 | 9/2012 | |
| GB | 179926 | 2/1924 | |
| GB | 2185286 A | 7/1987 | |
| JP | 57-052624 A | 3/1982 | |
| JP | 57052624 A | 3/1982 | |
| JP | 61164039 A | 7/1986 | |
| JP | 01-182560 A | 7/1989 | |
| JP | 5263671 A | 12/1993 | |
| JP | 11-182255 A | 7/1999 | |
| JP | 2002-285879 A | 10/2002 | |
| JP | 2002303145 A | 10/2002 | |
| JP | 2002349270 A | 12/2002 | |
| JP | 2006194227 A | 7/2006 | |
| JP | WO 2009040642 A1 | * 4/2009 | ........... F01N 13/107 |
| JP | 2010038091 A | 2/2010 | |
| WO | 9802653 A1 | 1/1998 | |
| WO | 2005068804 A1 | 7/2005 | |
| WO | 2010015654 A1 | 2/2010 | |

OTHER PUBLICATIONS

PCT/US2009/034392 filed Feb. 18, 2009, International Search Report for BorgWarner Inc. et al. dated Sep. 29, 2009, 3 pages.
Moller et al, Divided Exhaust Period—A Gas Exchange System for Turbocharged SI Engines, SAE Technical Paper Series, 2005-01-1150, SAE International.
PCT/US2011/021846 Filed Jan. 20, 2011. International Search Report and Written Opinion; 6 pages. dated Sep. 26, 2011.
Chinese Office Action dated Feb. 16, 2015 ; Application No. 201180005403. X; Applicant BorgWarner Inc., 13 pages.
Korean Office Action dated Jan. 12, 2017 ; Application No. 10-2012-7021000; Applicant: BorgWarner Inc.; 6 pages.

* cited by examiner

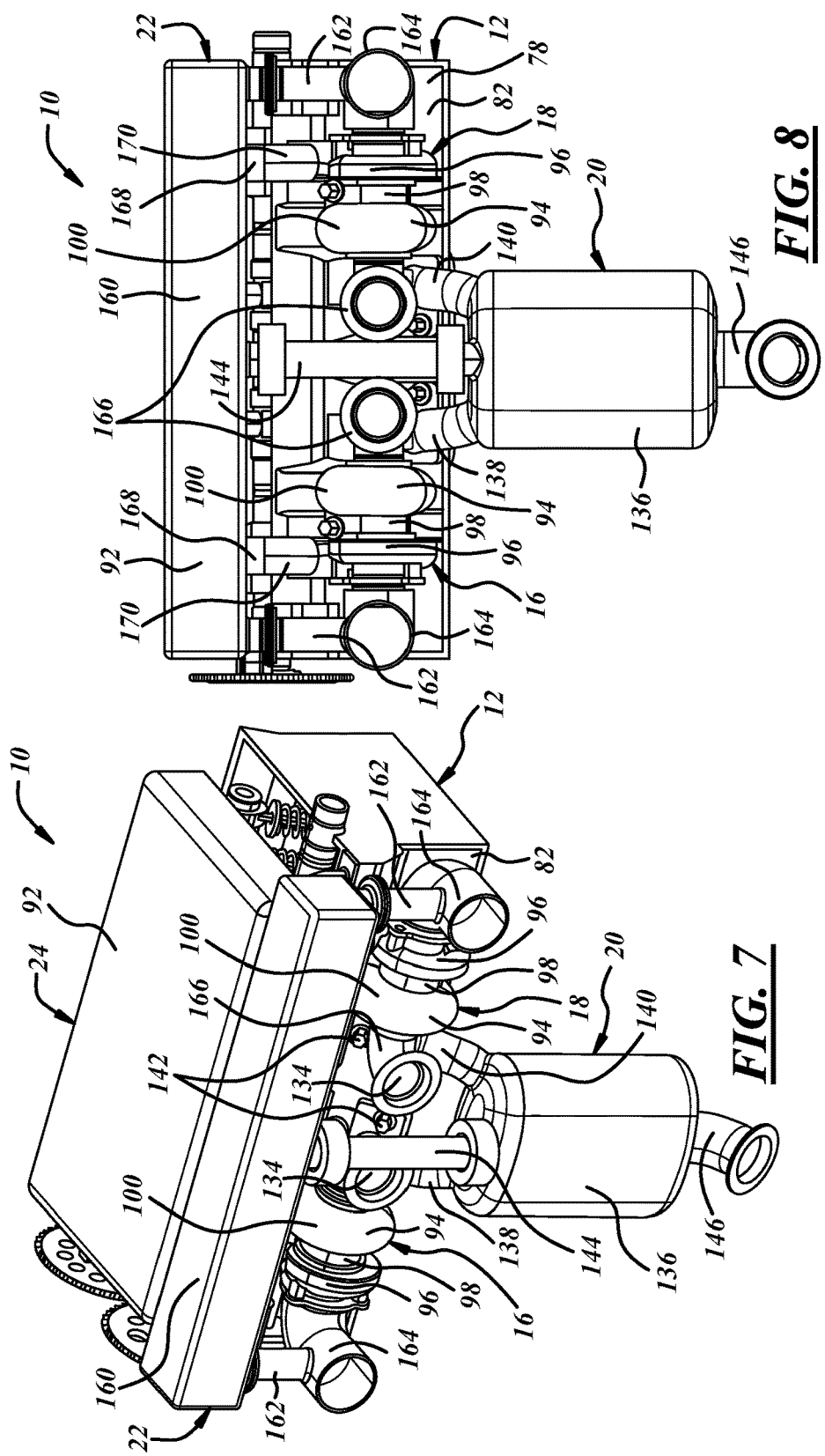

DIRECTLY COMMUNICATED TURBOCHARGER

CROSS-REFERENCE TO RELATED APPLICATIONS

This application is a divisional of U.S. application Ser. No. 13/522,534 filed Jul. 17, 2012, which claims the benefit of PCT Application Serial No. 2011/21846 filed Jan. 20, 2011 and U.S. Provisional Application Ser. No. 61/297,422 filed Jan. 22, 2010.

TECHNICAL FIELD

The technical field generally relates to internal combustion engines, turbochargers, and other components of an internal combustion engine breathing system.

BACKGROUND

Internal combustion engines are often equipped with internal combustion engine breathing systems to decrease emissions and increase engine efficiency. The breathing systems may include one or more turbochargers, one or more exhaust gas recirculation (EGR) assemblies, and other components. Valves and passages are commonly located throughout the breathing systems to regulate fluid-flow between the breathing system components.

SUMMARY OF ILLUSTRATIVE EMBODIMENTS OF THE INVENTION

One illustrative embodiment includes a product which may include a turbocharger. The turbocharger may include a turbine and a compressor. The turbine may have an inlet passage that may directly communicate with a blowdown exhaust passage of a cylinder head of an internal combustion engine and that may directly receive exhaust gas from the blowdown exhaust passage.

One illustrative embodiment includes a product which may include a cylinder head and a turbocharger. The cylinder head may have two or more cylinders. Each of the cylinders may have a blowdown exhaust passage and a scavenge exhaust passage. In the example of two cylinders and two blowdown exhaust passages, the two blowdown exhaust passages may converge toward each other into a single blowdown exhaust passage and may communicate with each other inside of the body of the cylinder head. The cylinder head may also have one or more passages. The turbocharger may have an inlet passage that may directly communicate with the single blowdown exhaust passage at a location that is downstream of the location where the two blowdown exhaust passages converged with each other. The inlet passage may directly receive exhaust gas from the single blowdown exhaust passage. The turbocharger may also have one or more passages that may directly communicate with the one or more passages of the cylinder head.

One illustrative embodiment includes a product which may include an internal combustion engine breathing system. The internal combustion engine breathing system may include a turbocharger, an aftertreatment device, an exhaust gas recirculation assembly, and a charge-air cooler. The turbocharger may include a turbine and a compressor. The turbine may have an inlet passage that may directly communicate with a blowdown exhaust passage of a cylinder head of an internal combustion engine. The inlet passage may also directly receive exhaust gas from the blowdown exhaust passage. The turbocharger may have numerous passages that may directly communicate with ports, passages, or both of the cylinder head. The aftertreatment device may communicate with a scavenge exhaust passage of the cylinder head and may receive exhaust gas from the scavenge exhaust passage. The exhaust gas recirculation assembly may communicate with the scavenge exhaust passage and may receive exhaust gas from the scavenge exhaust passage. The exhaust gas recirculation assembly may also communicate with the compressor. The charge-air cooler may be mounted to a cover of the cylinder head and may communicate with the compressor.

Other illustrative embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the present invention will become more fully understood from the detailed description and the accompanying drawings, wherein:

FIG. 7 is a perspective view of an illustrative embodiment of an internal combustion engine cylinder head, of a pair of turbochargers, of a catalytic converter, of an exhaust gas recirculation assembly, and of a charge-air cooler.

FIG. 8 is a front view of the components of FIG. 7.

DETAILED DESCRIPTION OF ILLUSTRATIVE EMBODIMENTS

Figure 1:
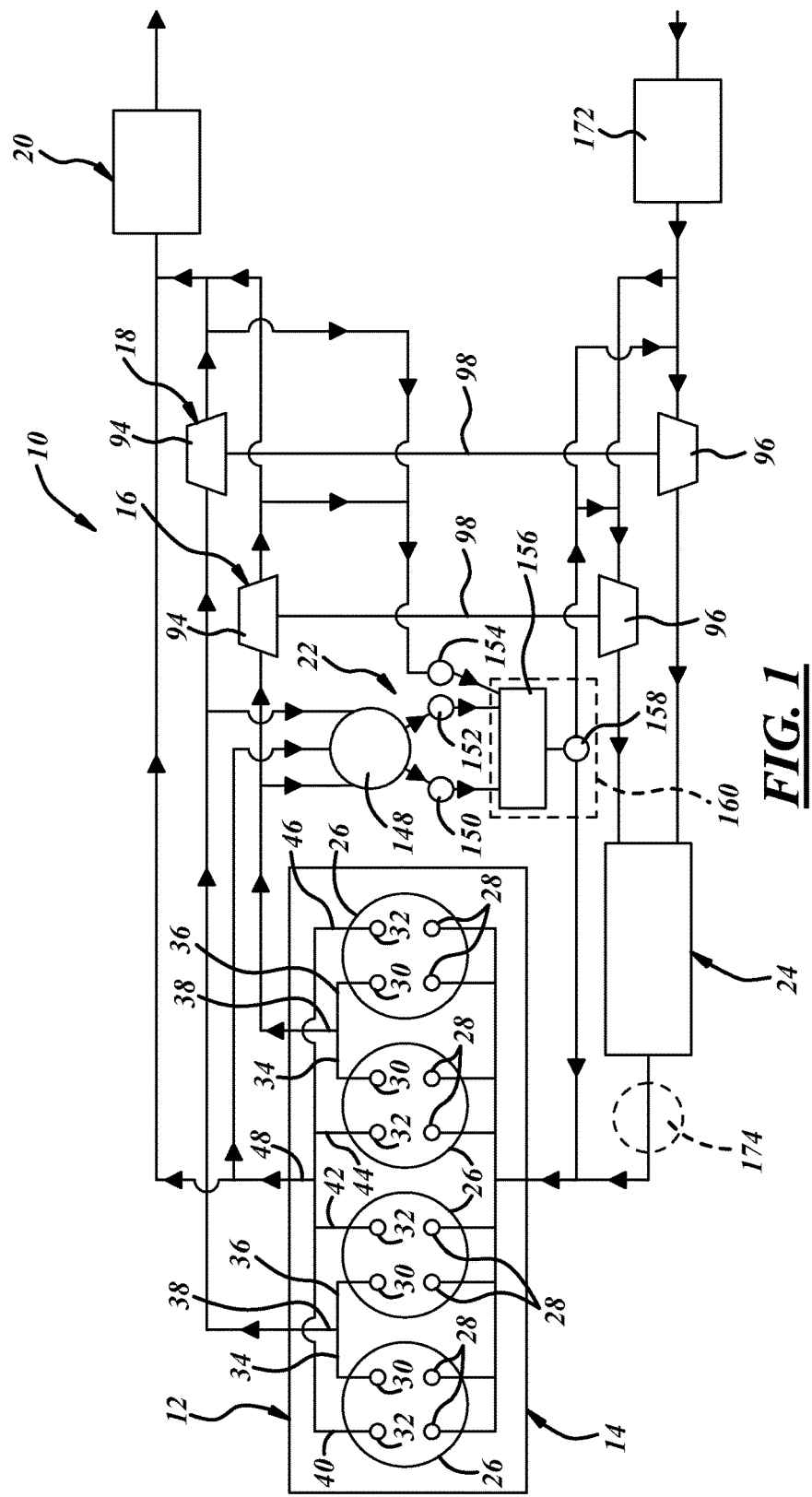
FIG. 1 is a schematic of an illustrative embodiment of an internal combustion engine cylinder head and of an internal combustion engine breathing system.

The following description of the embodiment(s) is merely exemplary (illustrative) in nature and is in no way intended to limit the invention, its application, or uses.

The figures illustrate several illustrative embodiments of an internal combustion engine (ICE) breathing system 10 that may include, among other components, a cylinder head 12 of an internal combustion engine (ICE) 14, a pair of turbochargers 16, 18, an exhaust gas aftertreatment device 20, an exhaust gas recirculation (EGR) subsystem or assembly 22, and a charge-air cooler 24. One or more of the components 12, 16, 18, 20, 22, and 24 may be designed for an integrated and compact construction of the ICE breathing system 10. This construction may generally minimize packaging and minimize cost. Among other things, the construction may also, though need not, increase turbocharger efficiency, increase turbocharger boost capability, eliminate the need for a turbocharger wastegate, and reduce the related pumping mean effective pressure (PMEP).

The ICE breathing system 10 may be used with the internal combustion engine 14 in order to manage fluid-flow delivered to the engine and expelled from the engine, and in order to decrease exhaust emissions and increase overall engine efficiency. The ICE breathing system 10 may have various arrangements and various engine breathing system components. The example arrangement of FIG. 1 is meant only to show some of the fluid-flow relationship possibilities among and between components of the ICE breathing system 10, and does not necessarily indicate direct or indirect connections or passages among and between the components. Other arrangements may exist and may depend on many factors including the architecture and type of the ICE 14; for example, blowdown exhaust ports may communicate with a proportional valve at a single inlet instead of at a pair of separate inlets as shown in FIG. 1.

Figure 2:
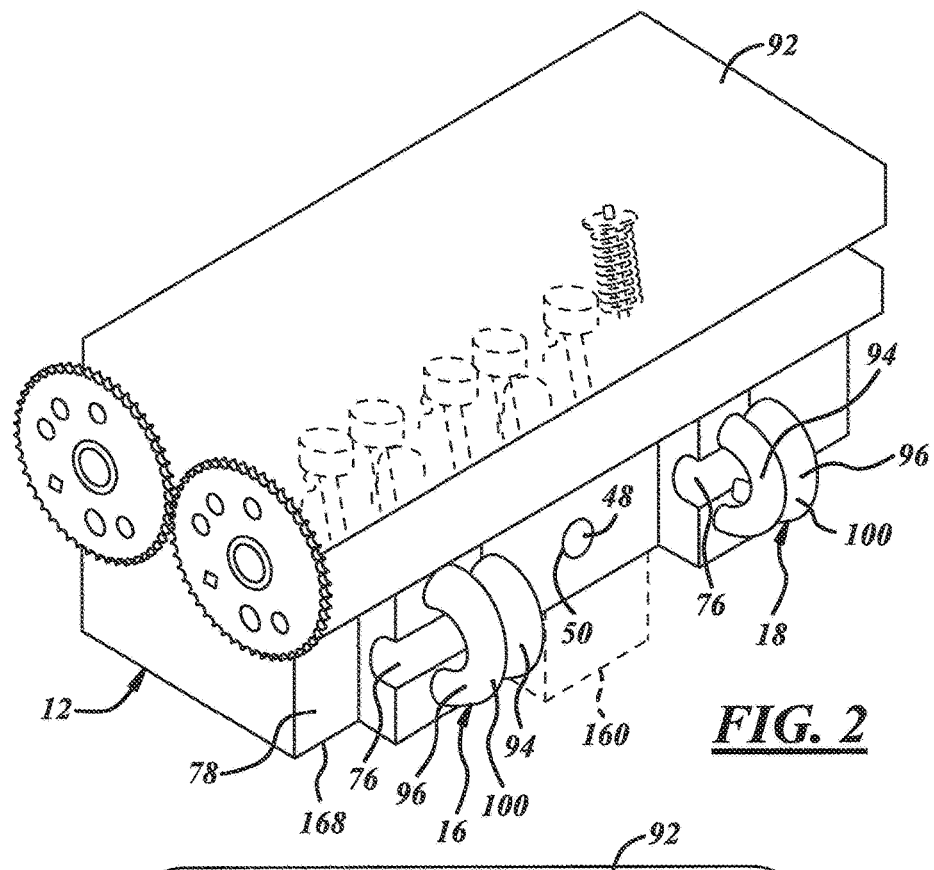
FIG. 2 is a schematic perspective view of an illustrative embodiment of an internal combustion engine cylinder head and of a pair of turbochargers.
Figure 3:
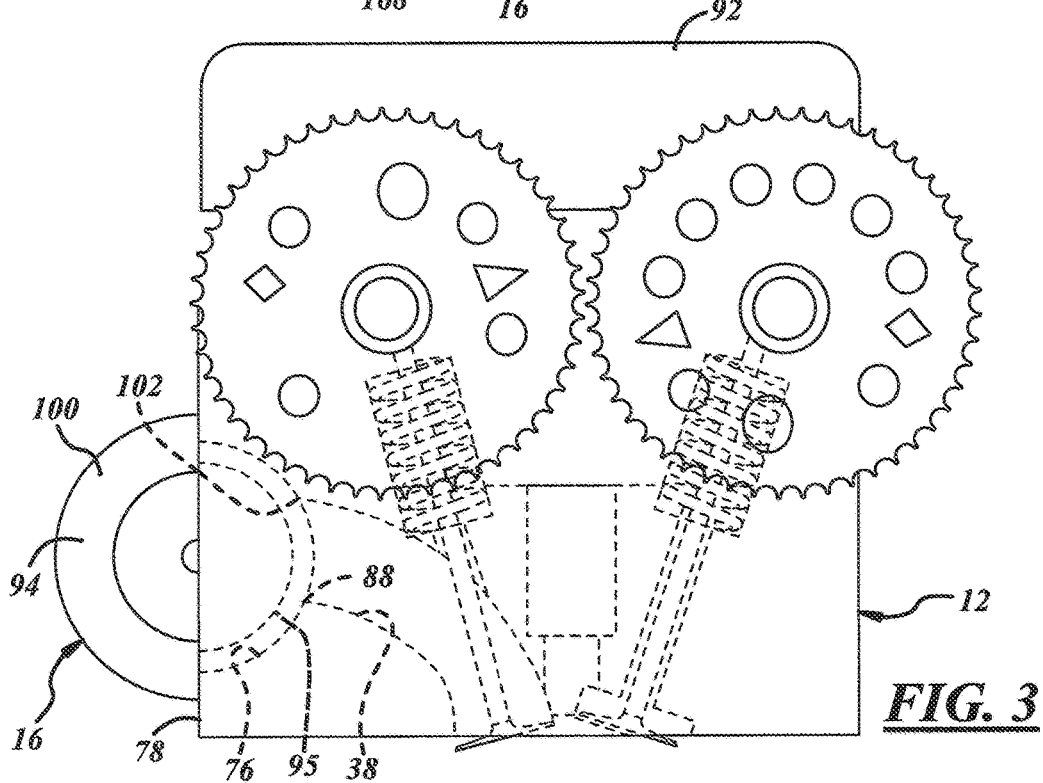
FIG. 3 a side view of the cylinder head and turbochargers of FIG. 2.
Figure 4:
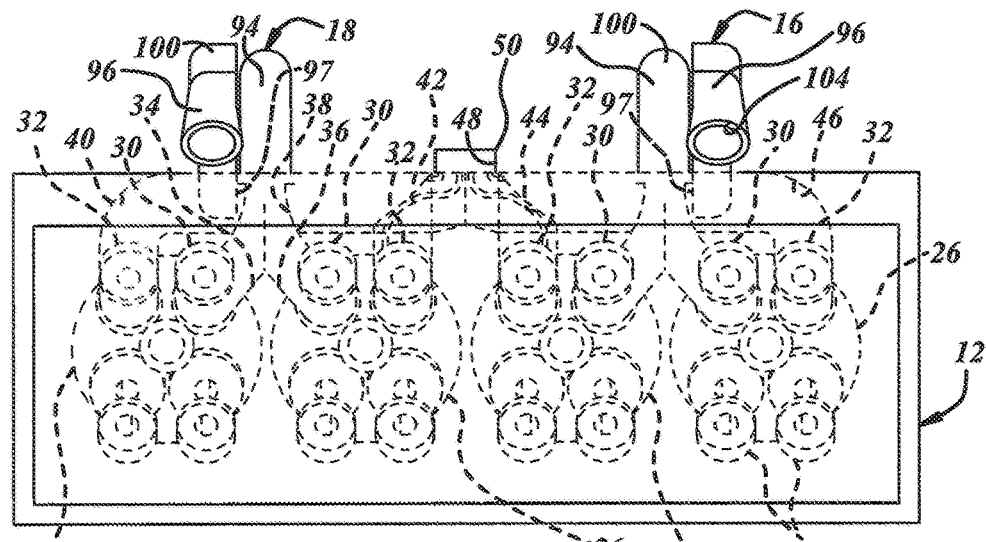
FIG. 4 is top view of the cylinder head and turbochargers of FIG. 2.

The cylinder head 12 may be located above cylinder bores and pistons of the ICE 14 and may accommodate installation of spark plugs, fuel injectors, exhaust valves, intake valves, and/or a camshaft or other valve actuation mechanism; the exact design of the cylinder head 12 may depend on many factors including the architecture and type of the ICE and the component construction and component arrangement such as turbocharger construction and arrangement and EGR assembly construction and arrangement. In the example of FIGS. 2-4, the cylinder head 12 may include four cylinders 26 arranged in-line. Each cylinder 26 may have a pair of intake valves 28, a blowdown exhaust valve 30, and a scavenge exhaust valve 32 (shown in phantom as poppet valves). The cylinder head 12 may be designed for divided exhaust gas flow—that is, blowdown and scavenge exhaust gas flow. Neighboring cylinders 26 may have blowdown exhaust passages that converge toward each other into a single and common blowdown exhaust passage before exiting the body of the cylinder head 12; for example, referring to FIG. 4, a first blowdown exhaust passage 34 and a second blowdown exhaust passage 36 may converge into a single blowdown exhaust passage 38. The exhaust gas from the first and second blowdown exhaust passages 34, 36 may come together and communicate at the single blowdown exhaust passage 38. The other neighboring cylinders 26 may have a similar construction so that there is a pair of single blowdown exhaust passages 38, and in other embodiments more than two blowdown exhaust passages can come together into a single blowdown exhaust passage. In still other embodiments, the blowdown exhaust passages need not converge toward each other.

Figure 10:
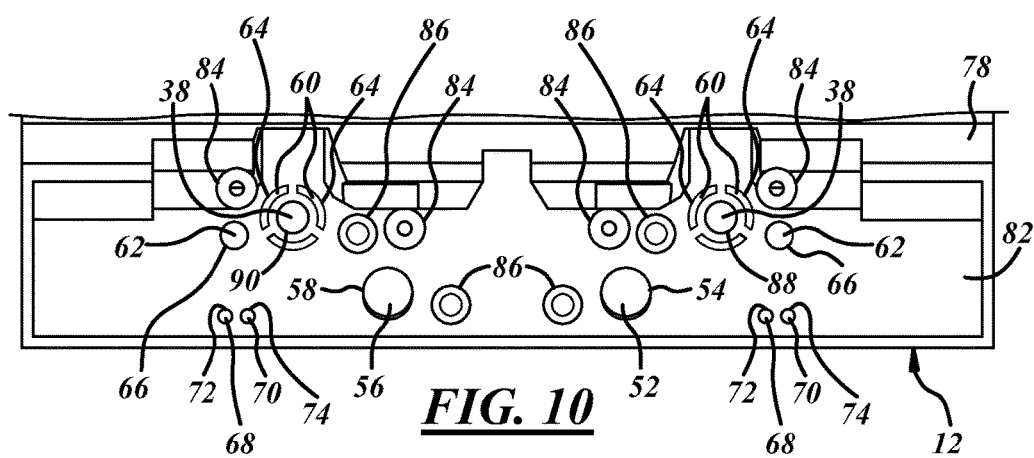
FIG. 10 is a close-up cut-away view of the internal combustion engine cylinder head of FIG. 7, with components removed in order to show an illustrative embodiment of various passages and ports of the internal combustion engine cylinder head.

Still referring to FIG. 4, the cylinders 26 may have scavenge exhaust passages that may converge toward one another into a single and common scavenge exhaust passage before exiting the body of the cylinder head 12; for example, a first scavenge exhaust passage 40, a second scavenge exhaust passage 42, a third scavenge exhaust passage 44, and a fourth scavenge exhaust passage 46 may converge into a single scavenge exhaust passage 48. The exhaust gas from the scavenge exhaust passages 40, 42, 44, and 46 may come together and communicate at the single scavenge exhaust passage 48, and may exit the cylinder head 12 at a single scavenge port opening 50. In other embodiments, such as that shown in FIG. 10, the first and second scavenge exhaust passages 40, 42 may converge into a first single scavenge exhaust passage 52 with a first single scavenge port opening 54, and the third and fourth scavenge exhaust passages 44, 46 may converge into a second single scavenge exhaust passage 56 with a second single scavenge port opening 58.

The cylinder head 12 may also have various passages routed throughout its body in order to carry various fluids therethrough. For example, referring still to FIG. 10, a coolant passage supply 60 and a coolant passage return 62 may be provided in the cylinder head 12 for coolant flow in the cylinder head and in the turbochargers 16, 18, as will be subsequently described. The coolant passage supply 60 may have one or more coolant supply openings 64, and the coolant passage return 62 may have one or more coolant return openings 66. Also, an oil passage supply 68 and an oil passage return 70 may be provided in the cylinder head 12 for oil and/or lubrication flow in the cylinder head and in the turbochargers 16, 18. The oil passage supply 68 may have one or more oil supply openings 72, and the oil passage return 70 may have one or more oil return openings 74.

Figure 5:
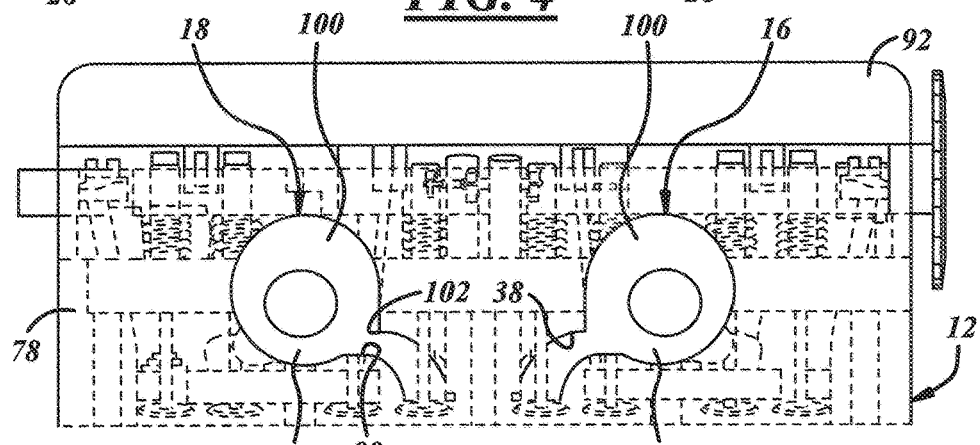
FIG. 5 is a schematic side view of an illustrative embodiment of an internal combustion engine cylinder head and of a pair of turbochargers.
Figure 6:
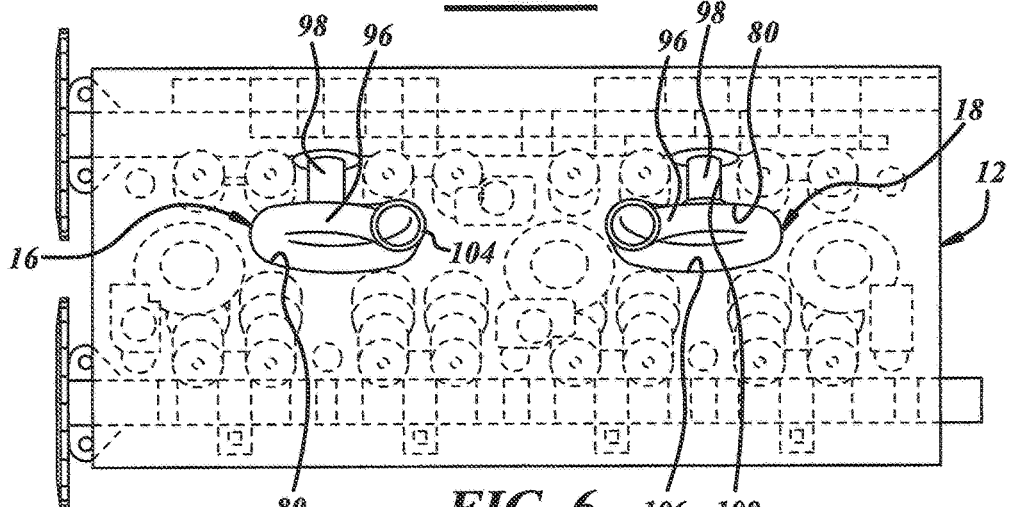
FIG. 6 is top view of the cylinder head and turbochargers of FIG. 5.

The cylinder head 12 may have different constructions and/or components than the constructions and components already described. In the embodiment of FIGS. 2-4, the cylinder head 12 may have a cavity 76 located in a side wall 78 of the body of the cylinder head. The cavity 76 may be structured to cradle and support components of one of the turbochargers 16, 18; for example, the cavity may have a portion structured to support a turbine wheel 95, another portion structured to support a compressor wheel 97, and yet another portion structured to support a shaft assembly. In the embodiment of FIGS. 5 and 6, the cylinder head 12 may have an internal cavity 80 located inside the body of the cylinder head. The internal cavity 80 may be structured to cradle and support components of one of the turbochargers 16, 18; for example, the internal cavity may have a portion structured to fully support a compressor wheel, and may have another portion structured to fully or partly support a shaft assembly; indeed, the internal cavity may form part of a housing or cover of the turbochargers. And in the embodiment of FIGS. 7-10, the cylinder head 12 may have a mounting face 82 located in the side wall 78 of the body of the cylinder head. The mounting face 82 may be a planar wall that may be recessed in the side wall 78. In addition to the openings 64, 66, 72, and 74, one or more turbocharger mounts 84 and one or more maniverter mounts 86 may be located at the mounting face 82. Also, as alluded to, referring to FIG. 10, blowdown exhaust gas may exit the cylinder head 12 at a first single blowdown port opening 88 and at a second single blowdown port opening 90.

The cylinder head 12 may be equipped with any suitable valve actuation mechanism in order to actuate the intake valves 28, actuate the blowdown exhaust valves 30, and actuate the scavenge exhaust valves 32, or the particular valve actuation mechanism can be provided as a separate component that is unassociated with the cylinder head 12. The valve actuation mechanism may have variable valve timing functionality. In one example, the valve actuation mechanism may include individual actuators such as solenoids. In another example, a dual acting concentric cam device may be used to actuate the valves 28, 30, and 32 independently of one another. One suitable dual acting concentric cam device is disclosed in the International Application No. PCT/US09/34392 with an international filing date of Feb. 18, 2009, titled Controlling Exhaust Gas Flow Divided Between Turbocharging and Exhaust Gas Recirculating, and in the name of applicant BorgWarner Inc. In this example, the dual acting concentric cam device may be controlled by the method taught in the International Application No. PCT/US09/34392. Using that control method, or using another suitable control method, exhaust gas and the associated energy may be delivered to the turbochargers 16, 18 in a selective way to control turbocharger boost via valve event timing without the use of a turbine bypass, as taught in the International Application No. PCT/US09/34392. For example, opening and/or closing of the blowdown exhaust valves 30 and of the scavenge exhaust valves 32 may be advanced or retarded to manage blowdown exhaust gas flow to the turbochargers 16, 18. In a similar way, turbocharger boost efficiency may be optimized. Of course, other suitable valve actuation mechanisms and control methods are possible.

A cover 92 may be provided in order to close the top side of the cylinder head 12. The cover 92 may be bolt-on to the body of the cylinder head 12 and may carry or be integrated with other components, as will be subsequently described. The exact design of the cover 92 may depend on many factors including the architecture and type of the ICE 14 and the component construction and component arrangement such as turbocharger construction and arrangement and EGR assembly construction and arrangement.

The internal combustion engine 14 may combust fuel with an oxidizer (e.g., air) and may expel fluid, such as exhaust gas which may include gas, liquid, and other matter, thereafter to the ICE breathing system 10. The ICE 14 may be a spark-ignited engine (e.g., gasoline, methanol), a diesel engine, an alternative fuel engine, or another type. The ICE 14 may be of different types having different arrangements and different numbers of cylinders (e.g., in-line, I-2, I-4, I-6, V-type, V-6, V-8, etc.). A cylinder block (not shown) may sit below the cylinder head 12 and may have cylindrical bores to accommodate reciprocating pistons. The ICE 14 may function under a four-stroke engine operating cycle with a blowdown phase and a scavenging phase. In the blowdown phase, the blowdown exhaust valves 30 may open just before the associated piston reaches a bottom dead center (BDC) position. Exhaust gas then enters the blowdown exhaust passages 34, 36 under relatively increased pressure. In the scavenging phase, the scavenge exhaust valves 32 open as the associated piston sweeps back up from the BDC position and toward a top dead center (TDC) position to displace most, if not all, of the remaining exhaust gas. The remaining exhaust gas then enters the scavenge exhaust passages 40, 42, 44, 46 under a comparatively decreased pressure. In some embodiments, an intake manifold and/or an exhaust manifold may be provided for the ICE 14; the exhaust manifold may include a blowdown exhaust manifold and a scavenge exhaust manifold which may be provided as separate components or as a one-piece component.

The turbochargers 16, 18 may be driven by exhaust gas expelled from the ICE 14 and may force an additional amount of air or air-fuel mixture into the ICE, as may otherwise be the case, to improve engine performance. The turbochargers 16, 18 may come in various types including a fixed geometry turbocharger, a variable geometry turbocharger, a 1-stage turbocharger, a 2-stage turbocharger, or the like. The turbochargers 16, 18 may directly communicate with the cylinder head 12 and with the blowdown exhaust passage 38, and may directly receive blowdown exhaust gas from the blowdown exhaust passage. In some cases, minimizing the total length that the exhaust gas has to travel from the exhaust valve to the turbocharger has advantages such as greater turbocharger efficiency and boost capability.

The words direct, directly, and their related forms—as used, for example, to describe the relation between the turbochargers and cylinder head—means without substantial intervening components and/or structures such as pipes, tubes, conduits, or the like. That is to say, for example, an inlet opening of the turbocharger may be located immediately at, and may be immediately aligned with, an outlet opening of the cylinder head, such that fluid exiting the outlet opening may immediately enter the inlet opening. Of course, seals and/or other structures may be used in order to properly facilitate this immediacy. This is in contrast to an indirect relation between a turbocharger and cylinder head in which one or more pipes, tubes, conduits, or the like are placed between the respective inlet and outlet openings.

Each of the turbochargers 16, 18 may include a turbine 94, a compressor 96, and a shaft assembly 98. The turbine 94 may have a turbine wheel 95 that is driven by the exhaust gas expelled from the ICE 14, and the compressor 96 may have a compressor wheel 97 that rotates with the turbine wheel 95 via the common shaft assembly 98. The compressor 96 pressurizes air and other fluid that, after leaving the compressor, eventually enters the intake side of the ICE 14. The shaft assembly 98 may include bearings, bushings, and the like that facilitate rotation between, and connection to, the turbine and compressor wheels 97. Though not shown and not necessary in all cases, the turbine 94 and compressor 96 may each include a bypass valve and related passage, or waste gate, which divert fluid around the turbine and compressor.

The exact construction and arrangement of the turbochargers 16, 18 may differ among different embodiments, and may depend on many factors including the architecture and type of the ICE 14 and the component construction and component arrangement such as cylinder head construction and arrangement and EGR assembly construction and arrangement. For example, referring to FIGS. 2-4, each of the turbochargers 16, 18 may include a housing or cover 100. The cover 100 may be physically connected to the cylinder head 12, and in this embodiment may directly mount to the side wall 78 of the cylinder head by bolting or may bolt directly to a mounting face of the cylinder head. When mounted, the cover 100 and the cavity 76 together may provide the structure needed to support rotation and proper functionality of the turbochargers 16, 18; for example, the cover may provide about one-half of the structure for the turbochargers while the cavity provides the other half. Like the cavity 76, the cover 100 may be structured to cradle and support the turbine 94, the compressor 96, and the shaft assembly 98; the cover may have a portion structured to support the turbine wheel, another portion structured to support the compressor wheel, and yet another portion structured to support the shaft assembly. These portions may be part of a unitary cover, or may be separate pieces that are connected together.

Still referring to the embodiment of FIGS. 2-4, the cover 100 may have various passages routed throughout its body in order to carry various fluids therethrough. For example, the cover 100 may have a coolant passage supply and return for coolant flow, and may have an oil passage supply and return for oil and/or lubrication flow. The coolant and oil passages of the cover 100 may directly communicate with the coolant and oil passages of the cylinder head 12, so that together the directly communicating passages may provide a single continuously extending passage between the cover and the cylinder head. Referring in particular to FIG. 3, an inlet opening 102 of the turbine 94 may directly communicate with the first single blowdown port opening 88 of the single blowdown exhaust passage 38 (same construction and arrangement may be provided for the other turbocharger at the second single blowdown port opening 90). Indeed, the inlet opening 102 and the first single blowdown port opening 88 may constitute the same opening, as shown in FIG. 3. The inlet opening 102 may lead to an inlet passage that may directly receive blowdown exhaust gas from the single blowdown exhaust passage 38 and that may direct blowdown exhaust gas to the turbine wheel 95 of the turbine 94. The inlet passage may be formed in part by the cavity 76. Referring now to FIG. 4, the cover 100 may have an outlet opening 104 of the compressor 96 which may communicate with the charge-air cooler 24.

Referring to the embodiment of FIGS. 5 and 6, the cover 100 may directly mount by bolting to the side wall 78 of the cylinder head 12, or may bolt directly to a mounting face of the cylinder head. In this embodiment, the cover 100 may be an external structure (with respect to the cylinder head 12) and may provide the entire structure needed to support rotation and proper functionality of the turbine 94 and part of, or all of, the shaft assembly 98. The structure needed to support rotation and proper functionality of the compressor 96, on the other hand, may be provided entirely by the internal cavity 80. The internal cavity 80 may have a portion 106 structured to fully support the compressor wheel of the compressor 96, and may have a portion 108 structured to fully or partly support the shaft assembly 98.

The external cover 100 may have various passages routed throughout its body in order to carry various fluids therethrough. For example, the cover 100 may have a coolant passage supply and return for coolant flow, and may have an oil passage supply and return for oil and/or lubrication flow. The coolant and oil passages of the cover 100 may directly communicate with the coolant and oil passages of the cylinder head 12, so that together the directly communicating passages may provide a single continuously extending passage between the cover and the cylinder head. Referring in particular to FIG. 5, the inlet opening 102 of the turbine 94 may directly communicate with the first single blowdown port opening 88 of the single blowdown exhaust passage 38 (same construction and arrangement may be provided for the other turbocharger at the second single blowdown port opening 90). Indeed, the inlet opening 102 and the first single blowdown port opening 88 may constitute the same opening, as shown in FIG. 5. The inlet opening 102 may lead to an inlet passage that may directly receive blowdown exhaust gas from the single blowdown exhaust passage 38 and that may direct blowdown exhaust gas to the turbine wheel 95 of the turbine 94. The inlet passage may be formed in part by the external cover 100. Referring now to FIG. 6, the internal cavity 80 may, in part, form the outlet opening 104 of the compressor 96 which may communicate with the charge-air cooler 24.

Referring to the exemplary embodiment of FIGS. 7-12, the cover or housing 100 may be directly mounted to the mounting face 82 of the cylinder head 12 via bolts 110. In this embodiment, the housing 100 may have a mounting face 112 that may be generally planar like the mounting face 82, and that, when mounted, may directly oppose the mounting face of the cylinder head 12 through a gap or space, or oppose the mounting face by direct contact therewith. The housing 100 may be an external structure (with respect to the cylinder head 12), and may provide the entire structure needed to support rotation and proper functionality of the turbine 94, the compressor 96, and the shaft assembly 98; for example, the turbine wheel may be wholly and completely enclosed within the housing 100, the compressor wheel may be wholly and completely enclosed within the housing, and the shaft assembly with its shaft, bearings, bushings, and/or other components where applicable, may be wholly and completely enclosed within the housing. The housing 100 may include a turbine portion, a compressor portion, and a shaft assembly portion—all of which may be one or more separate pieces that are connected together upon assembly.

Figure 11:
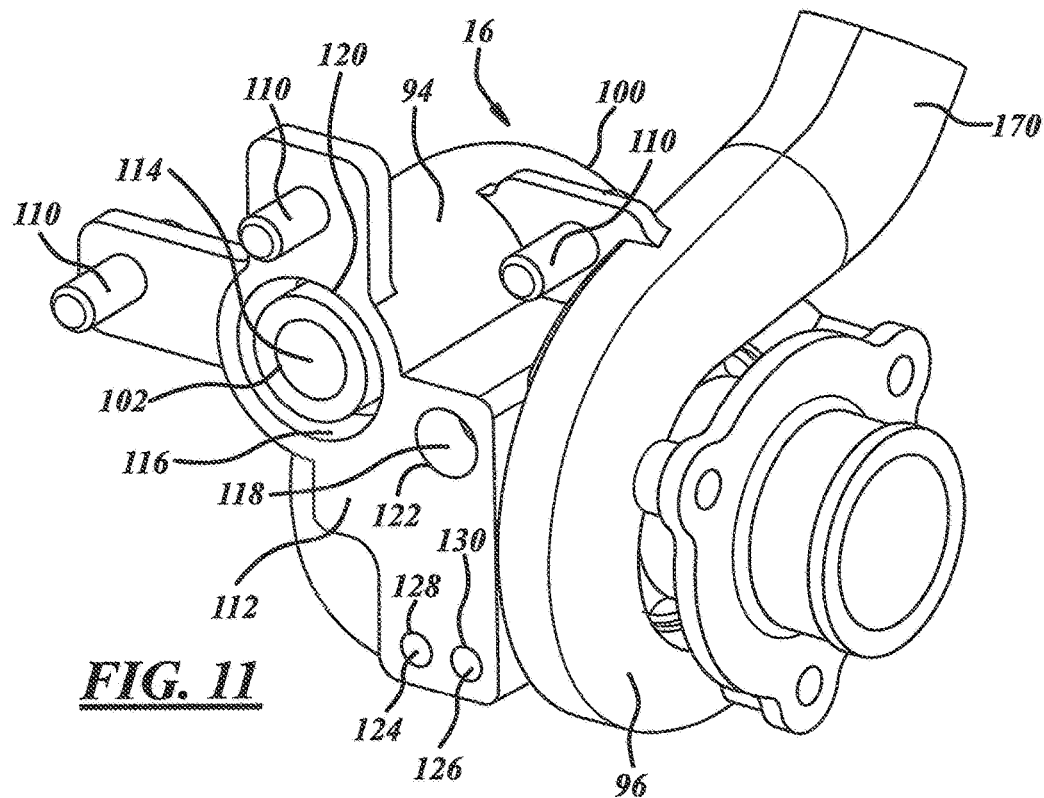
FIG. 11 is a perspective rear view of one of the turbochargers of FIG. 7.
Figure 12:
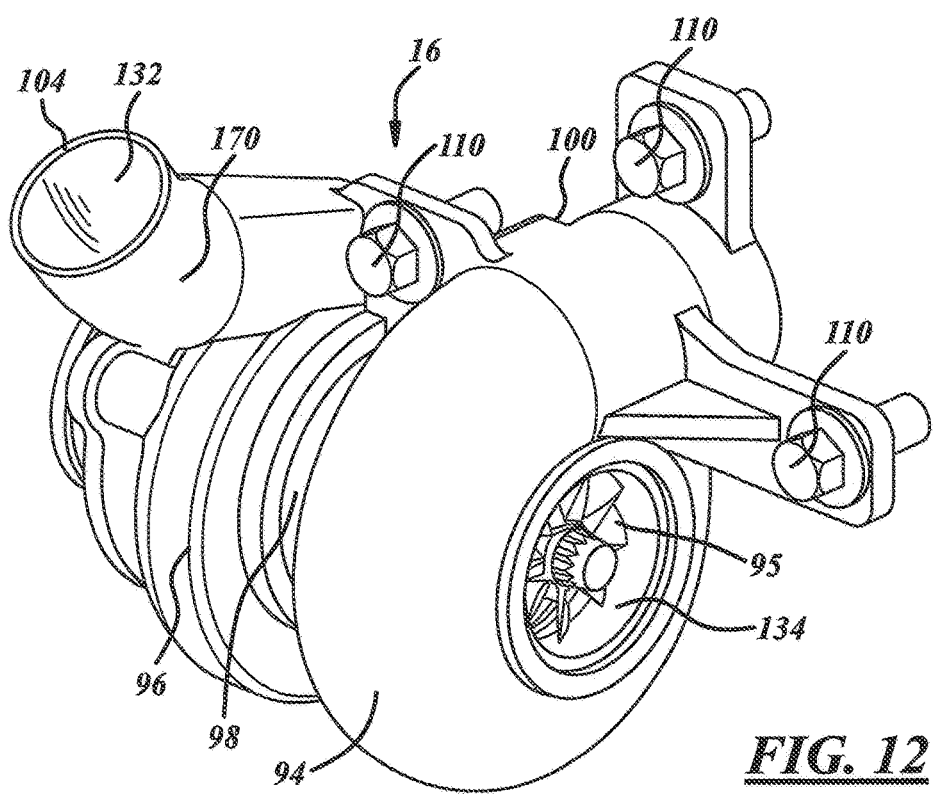
FIG. 12 is a perspective front view of the turbocharger of FIG. 11.

Referring to FIG. 11, the housing 100 may have various passages routed throughout its body in order to carry various fluids therethrough. For example, the housing 100 may have an inlet passage 114 of the turbine 94 which may directly receive blowdown exhaust gas from the respective single blowdown exhaust passage 38 and which may direct blowdown exhaust gas to the turbine wheel 95 of the turbine 94. When assembled, the inlet opening 102 of the inlet passage 114 may be directly aligned with and may directly confront the first or second single blowdown port openings 88, 90. As a result, the inlet passage 114 and the respective single blowdown exhaust passage 38 may provide a single continuously extending passage between the housing 100 and the cylinder head 12. The housing 100 may also have a coolant passage supply 116 and a coolant passage return 118. The coolant passage supply 116 may have one or more coolant supply openings 120, and the coolant passage return 118 may have one or more coolant return openings 122. The housing 100 may further have an oil passage supply 124 and an oil passage return 126. The oil passage supply 124 may have one or more oil supply openings 128, and the oil passage return 126 may have one or more oil return openings 130. The coolant and oil passages 116, 118, 124, 126, may respectively directly communicate with the coolant and oil passages 60, 62, 68, 70, of the cylinder head 12, so that together the directly communicating passages may respectively provide a single continuously extending passage between the housing 100 and the cylinder head. Referring to FIG. 12, the housing 100 may have an outlet passage 132 of the compressor 96 which may communicate with the charge-air cooler 24. The outlet passage 132 may have the outlet opening 104. And the housing 100 may have an outlet passage 134 of the turbine 94 which may, though not shown, communicate with the aftertreatment device 20 or may eventually deliver exhaust gas out of the ICE breathing system 10.

The exhaust gas aftertreatment device 20 may be equipped on the exhaust side of the ICE 14 and may be used to help reduce exhaust emissions of the exhaust gas that passes through it. The aftertreatment device 20 may come in various types including a catalytic converter, a diesel particulate filter (DPF), a soot trap, and/or the like. The exact type used may depend on many factors including the architecture and type of the ICE 14 and the environmental regulations of the particular jurisdiction in which the ICE will be used. Referring to the illustrative embodiment of FIGS. 7-9, the aftertreatment device 20 may be a close-coupled catalytic converter 136. The catalytic converter 136 may have a first and second inlet pipe 138, 140 that respectively define first and second inlet passages. The first and second inlet pipes 138, 140 may be directly mounted to the mounting face 82 of the cylinder head 12 via flanges at the ends of the pipes and bolts 142, and may be mounted respectively at the first and second single scavenge exhaust ports 52, 56; of course other mounting ways are possible. The first and second inlet passages of the first and second inlet pipes 138, 140 may respectively directly communicate with the first and second single scavenge exhaust ports 52, 56 of the cylinder head 12, so that together the directly communicating passages and ports may respectively provide a single continuously extending passage between the catalytic converter 136 and the cylinder head. The first and second inlet passages of the first and second inlet pipes 138, 140 may respectively directly receive scavenge exhaust gas from the first and second single scavenge exhaust ports 52, 56. Though not shown in FIGS. 7-9, the catalytic converter 136 may also receive blowdown exhaust gas flow from the outlet passages 134 of the turbines 94.

Figure 9:
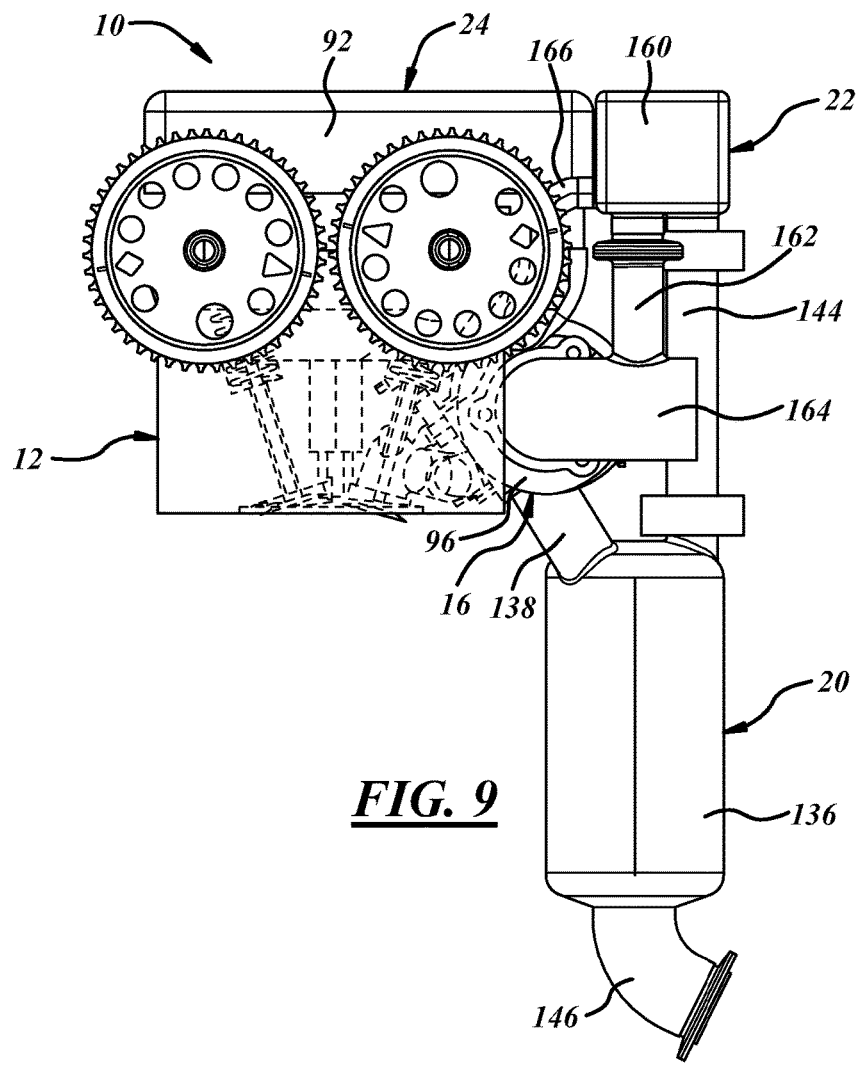
FIG. 9 is a side view of the components of FIG. 7.

Still referring to FIGS. 7-9, the catalytic converter 136 may also have a bypass pipe 144 and an outlet pipe 146. The bypass pipe 144 may define a bypass passage which may communicate with the EGR assembly 22. And the outlet pipe 146 may define an outlet passage which may eventually deliver exhaust gas which goes therethrough out of the ICE breathing system 10 and eventually to the atmosphere.

The EGR assembly 22 may be used to recirculate and direct a measured amount of exhaust gas expelled from the ICE 14 back to the intake side of the ICE. Depending on the embodiment and circumstances, the recirculated exhaust gas may mix with incoming air and/or air-fuel mixture and may decrease or increase the combustion temperature taking place in the ICE 14. The EGR assembly 22 may have various constructions, arrangements, and components, including a high-pressure-loop EGR assembly and a low-pressure-loop EGR assembly. In the illustrative embodiments of FIG. 1, for example, the EGR assembly 22 may include a proportional or mix valve 148, a first EGR valve 150, a second EGR valve 152, a third EGR valve 154, an EGR cooler 156, and a fourth EGR valve 158.

Still referring to FIG. 1, the mix valve 148 may be used to regulate and apportion exhaust gas flow between the first and second EGR valves 150, 152, and particularly exhaust gas flow in the form of blowdown and scavenge exhaust gas flow. The mix valve 148 may selectively permit (open) exhaust gas flow to the first and/or second EGR valves 150, 152, and may selectively prevent (close) exhaust gas flow to the first and/or second EGR valves. When permitting exhaust gas flow, the mix valve 148 may partially permit exhaust gas flow to a desired degree (partially open); that is, the mix valve can be less than fully open. The mix valve 148 may apportion any percentage amount of scavenge exhaust gas flow and blowdown exhaust gas flow therethrough and eventually to the intake side of the ICE 14; for example, a larger percentage amount of scavenge exhaust gas may be directed to the intake side than blowdown exhaust gas. As shown in FIG. 1, the mix valve 148 may communicate with and may receive exhaust gas flow from the blowdown exhaust passages and the scavenge exhaust passages. In some embodiments, the mix valve 148 may be used to control turbocharger boost; for example, the mix valve can be opened to receive blowdown exhaust gas from the blowdown exhaust passages, taking away blowdown exhaust gas that may otherwise be provided to the turbocharger, and thus reducing turbocharger boost. In some embodiments, the mix valve 148 need not be provided whereby the first and second EGR valves 150, 152 communicate with the blowdown and scavenge exhaust passages.

The first or blowdown EGR valve 150 may be used to regulate blowdown exhaust gas flow from the mix valve 148. The first EGR valve 150 may selectively permit (open) blowdown exhaust gas flow to the EGR cooler 156, and may selectively prevent (close) blowdown exhaust gas flow to the EGR cooler. The second or scavenge EGR valve 152 may be used to regulate scavenge exhaust gas flow from the mix valve 148. The second EGR valve 152 may selectively permit (open) scavenge exhaust gas flow to the EGR cooler 156, and may selectively prevent (close) scavenge exhaust gas flow to the EGR cooler. The third EGR valve 154 may be used to regulate exhaust gas flow from the turbines 94 of the turbochargers 16, 18. The third EGR valve 154 may selectively permit (open) exhaust gas flow to the EGR cooler 156, and may selectively prevent (close) exhaust gas flow to the EGR cooler. The first and second EGR valves 150, 152 may be a part of a high-pressure-loop EGR assembly, and the third EGR valve 154 may be a part of a low-pressure-loop EGR assembly.

The EGR cooler 156 may be a heat exchanger that lowers the temperature of exhaust gas that passes through it. The EGR cooler 156 may come in various types including an in-line type, a u-shaped type, or another type. The exact type used may depend on many factors including the architecture and type of the ICE 14, and the construction and arrangement of other components of the EGR assembly 22. As shown in FIG. 1, the EGR cooler 156 may communicate with the first, second, third, and fourth EGR valves 150, 152, 154, 158.

The fourth EGR valve 158 may be used to regulate exhaust gas flow between the intake ports of the cylinder head 12 and the compressors 96 of the turbochargers 16, 18. The fourth EGR valve 158 may selectively permit (open) exhaust gas flow to the cylinder head 12 or the compressors 96, and may selectively prevent (close) exhaust gas flow to the cylinder head or the compressors. The fourth EGR valve 158 may communicate with and may receive exhaust gas flow from the EGR cooler 156.

In the illustrative embodiment of FIGS. 7-9, the EGR cooler 156 and the fourth EGR valve 158 may be integrated and structurally combined into a single component 160 (represented by phantom rectangle in FIG. 1)—as opposed to being two separate components, though this is an option. In some cases, the single or common structure of the EGR cooler 156 and fourth EGR valve 158 may provide packaging and assembly advantages. The integrated component 160 may receive scavenge exhaust gas flow directly from the bypass passage of the bypass pipe 144, and/or may receive blowdown exhaust gas flow exiting the outlet passages 134 of outlet pipes 166 of the turbines 94. The integrated component 160 may then direct exhaust gas flow via outlet pipes 162 and its associated outlet passages to inlet pipes 164 and its associated inlet passages of the compressors 96, may direct exhaust gas flow to the charge-air cooler 24, and/or may direct exhaust gas flow to the intake ports of the cylinder head 12. The integrated component 160 may have a coolant passage supply and return via coolant pipes 166 in order to provide coolant flow. The coolant pipes 166 may communicate with coolant passages of the cylinder head 12.

In other embodiments, the EGR assembly 22, or components thereof, may be directly mounted to the cylinder head 12. For example, referring to FIG. 2, the integrated component 160 may be mounted by bolting to a bottom wall 168 of the cylinder head 12 (shown in phantom). The integrated component 160 may be positioned so as not to structurally obstruct or interfere with the cylinder block sitting below the cylinder head 12 when the ICE 14 is assembled. In this embodiment, the integrated component 160 may communicate directly with, and may directly receive scavenge exhaust gas from, the scavenge exhaust ports of the cylinder head 12. In a similar embodiment, the integrated component 160 may also include the mix valve 148, may be mounted by bolting to the bottom wall 168, and may communicate directly with, and may directly receive exhaust gas from, both the scavenge exhaust ports and the blowdown exhaust ports of the cylinder head 12.

The EGR assembly 22 may have more, less, and/or different components than shown and described; for example, the EGR assembly need not have all of the valves shown in FIG. 1 and instead could have a 3- or 4-way valve located upstream of the EGR cooler 156 and performing the functions of one or more of the described EGR valves 150, 152, 154, 158.

The charge-air cooler 24 may be used to lower the temperature of (cool) fluid, such as air and/or recirculated exhaust gas, that passes through it. The charge-air cooler 24 may come in various types; the exact type used depends on many factors including the architecture and type of the ICE 14 and on the construction and arrangement of other components of the ICE breathing system 10. Referring to FIG. 1, the charge-air cooler 24 may receive fluid flow from the compressors 96, and may then direct fluid flow to the intake ports of the cylinder head 12. In the illustrative embodiment of FIGS. 7-9, the charge-air cooler 24 may be integrated with the cover 92; for example, the charge-air cooler may be mounted directly to the top side or bottom side of the cover by bolting. The integrated charge-air cooler 24 may have inlet pipes 168 and their associated inlet passages that directly communicate and receive fluid flow from outlet pipes 170 and the associated outlet passages 132 of the compressors 96. In other embodiments, the charge-air cooler 24 need not be integrated with the cover 92 and instead could be a separate component unassociated with the cover.

In other embodiments, the ICE breathing system 10 may have more, less, and/or different components than shown and described. For example, one or more additional valves may be located throughout the ICE breathing system 10 in order to manage fluid flow among and between different components and passages; referring to FIG. 1, an air filter 172 may be located upstream the compressors 96; a throttle valve 174 (shown in phantom in FIG. 1) may be located downstream of the charge-air cooler 24 and may regulate fluid flow entering the ICE 14; and another aftertreatment device may be provided in the ICE breathing system (not shown). The ICE breathing system 10 may further include the sensors and/or controllers described in the International Application No. PCT/US09/34392, and may have the components and arrangements described in the International Application No. PCT/US09/34392.

The above description of embodiments of the invention is merely exemplary in nature and, thus, variations thereof are not to be regarded as a departure from the spirit and scope of the invention.

What is claimed is:

1. A product comprising:
a turbocharger including a first turbine and a second turbine, wherein the first turbine and the second turbine each include outlets directed at each other, the first turbine having a first inlet opening, an engine that has first, second, third and fourth cylinders, with first and second blowdown exhaust passages extending in the engine and converging to a first converged blowdown exhaust passage that is connected directly to the first inlet opening and between the first and second cylinders, the second turbine having a second inlet opening, with third and fourth blowdown exhaust passages extending in the engine and converging to a second converged blowdown exhaust passage that is connected directly to the second inlet opening and between the third and fourth cylinder, the first cylinder having a first blowdown exhaust port and a first scavenger exhaust port, the second cylinder having a second blowdown exhaust port and a second scavenger exhaust port, the first blowdown exhaust port, first scavenger exhaust port, second scavenger exhaust port, and second blowdown exhaust port being in line with each other, and wherein the first blowdown exhaust port and second blowdown exhaust port are adjacent to each other and interposed between the first scavenger exhaust port and the second scavenger exhaust port, the first blowdown exhaust port communicating with the first blowdown exhaust passage, the second blowdown exhaust port communicating with the second blowdown exhaust passage, the first scavenger exhaust port communicating with a first scavenger exhaust passage, the second scavenger exhaust port communicating with a second scavenger exhaust passage, wherein the first scavenger exhaust passage and the second scavenger exhaust passage converge into a single scavenger exhaust passage.

2. The product as set forth in claim 1 wherein the first, second, third and fourth cylinders are aligned along a length of the engine and wherein neither of the first blowdown exhaust passage or the second blowdown exhaust passage extend along the length past any of the cylinders.

3. The product as set forth in claim 1 wherein the first, second, third and fourth cylinders are aligned along a length of the engine and wherein the first, second, third, fourth, first converged and second converged blowdown exhaust passages extend along the length a distance that does not extend past any cylinder.

4. The product as set forth in claim 1 wherein the first converged blowdown exhaust passage directly connects the first and second cylinders with the first inlet opening by each registering with one of the first and second cylinders and joining to the first converged exhaust blowdown passage, and the second converged blowdown exhaust passage directly connects the third and fourth cylinders with the second inlet opening by each registering with one of the third and fourth cylinders and joining to the second converged exhaust blowdown passage.

5. The product as set forth in claim 1 wherein the first and second turbines are disposed on the engine and each is connected with a respective first and second compressor, the first and second compressors disposed on opposite sides of the respective first and second turbines.

\* \* \* \* \*